(12) United States Patent
Gaal et al.

(10) Patent No.: US 9,031,010 B2
(45) Date of Patent: May 12, 2015

(54) SEPARATE RESOURCE PARTITIONING MANAGEMENT FOR UPLINK CONTROL AND UPLINK DATA SIGNALS

(75) Inventors: Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 516 days.

(21) Appl. No.: 13/079,716

(22) Filed: Apr. 4, 2011

(65) Prior Publication Data

US 2012/0082101 A1 Apr. 5, 2012

Related U.S. Application Data

(60) Provisional application No. 61/322,228, filed on Apr. 8, 2010.

(51) Int. Cl.
| | |
|---|---|
| *H04W 72/04* | (2009.01) |
| *H04W 72/12* | (2009.01) |
| *H04W 84/04* | (2009.01) |

(52) U.S. Cl.
CPC ...... *H04W 72/1226* (2013.01); *H04W 72/1289* (2013.01); *H04W 84/045* (2013.01); *H04W 72/1268* (2013.01)

(58) Field of Classification Search
CPC .................. H04W 72/1289; H04W 72/082
See application file for complete search history.

(56) References Cited

U.S. PATENT DOCUMENTS

| | | | |
|---|---|---|---|
| 2009/0010240 A1* | 1/2009 | Papasakellariou et al. ... | 370/344 |
| 2009/0207793 A1* | 8/2009 | Shen et al. .................... | 370/329 |
| 2009/0257390 A1 | 10/2009 | Ji et al. | |
| 2010/0054203 A1* | 3/2010 | Damnjanovic et al. ....... | 370/329 |
| 2010/0074209 A1* | 3/2010 | Montojo et al. .............. | 370/329 |
| 2010/0322115 A1* | 12/2010 | Wei et al. ..................... | 370/280 |
| 2010/0322155 A1* | 12/2010 | Meyer et al. .................. | 370/328 |

FOREIGN PATENT DOCUMENTS

| | | |
|---|---|---|
| JP | 2010529773 A | 8/2010 |
| TW | 200952431 A | 12/2009 |
| WO | WO-2008153311 A1 | 12/2008 |

(Continued)

OTHER PUBLICATIONS

International Search Report and Written Opinion—PCT/US2011/031831, ISA/EPO—Jul. 5, 2011.

(Continued)

*Primary Examiner* — Kibrom T Hailu
*Assistant Examiner* — Teisha D Hall
(74) *Attorney, Agent, or Firm* — Tyler J. Overall

(57) ABSTRACT

Transmission management is provided with separate resource partitioning management for control and data transmissions. An evolved node B (eNB) generates separate resource partition schedules for the transmission stream, in which a first schedule is used for data transmissions while a second schedule is used for control signal transmissions. The two separate schemes may have different periodicities or different subframe type assignments that benefit either data or control transmissions or that allow for coordination of both data and control. The eNBs may broadcast the different schedules in regular system information messages, in which the UEs served by these eNBs will configure data and control signal transmissions according to the appropriate resource partition schedules.

52 Claims, 9 Drawing Sheets

(56) References Cited

FOREIGN PATENT DOCUMENTS

| WO | WO-2009037854 | A1 | 3/2009 |
| WO | WO-2009038367 | A1 | 3/2009 |
| WO | WO-2009116751 | A2 | 9/2009 |
| WO | WO-2009129261 | A1 | 10/2009 |
| WO | WO2010006208 | A1 | 1/2010 |
| WO | WO2010025249 | A1 | 3/2010 |
| WO | WO-2010028971 | A1 | 3/2010 |
| WO | WO2010141913 | A2 | 12/2010 |

OTHER PUBLICATIONS

Qualcomm Europe: "Carrier Aggregation in Heterogeneous Networks", 3GPP Draft; R1-092239, 3rd Generation Partnership Project (3GPP), Mobile Competence Centre; 650, Route Des Lucioles; F-06921 Sophia-Antipolis Cedex; France, no. San Francisco, USA; May 8, 2009, XP050339658, [retrieved on May 8, 2009].

Taiwan Search Report—TW100112251—TIPO—Jan. 2, 2014.

* cited by examiner

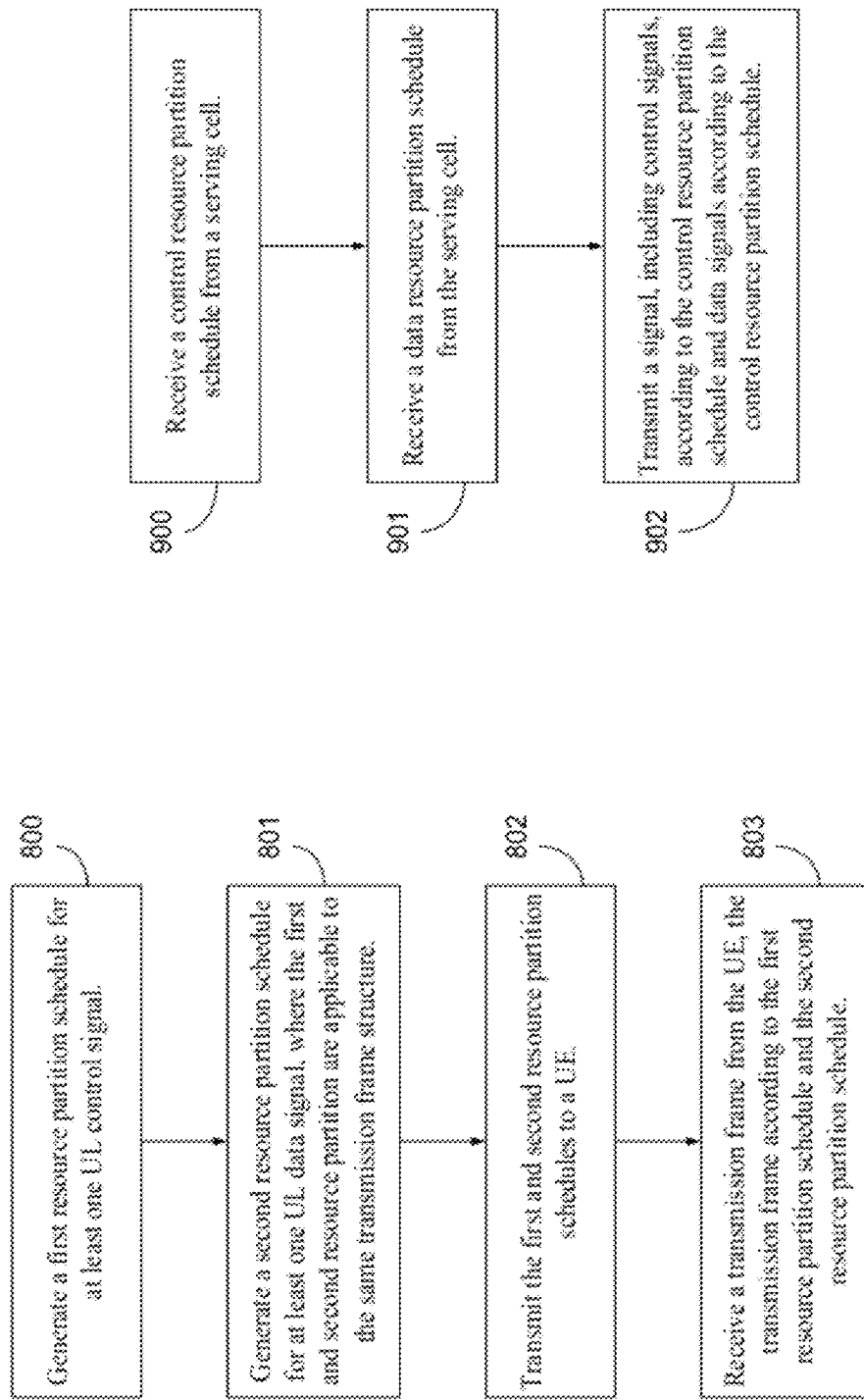

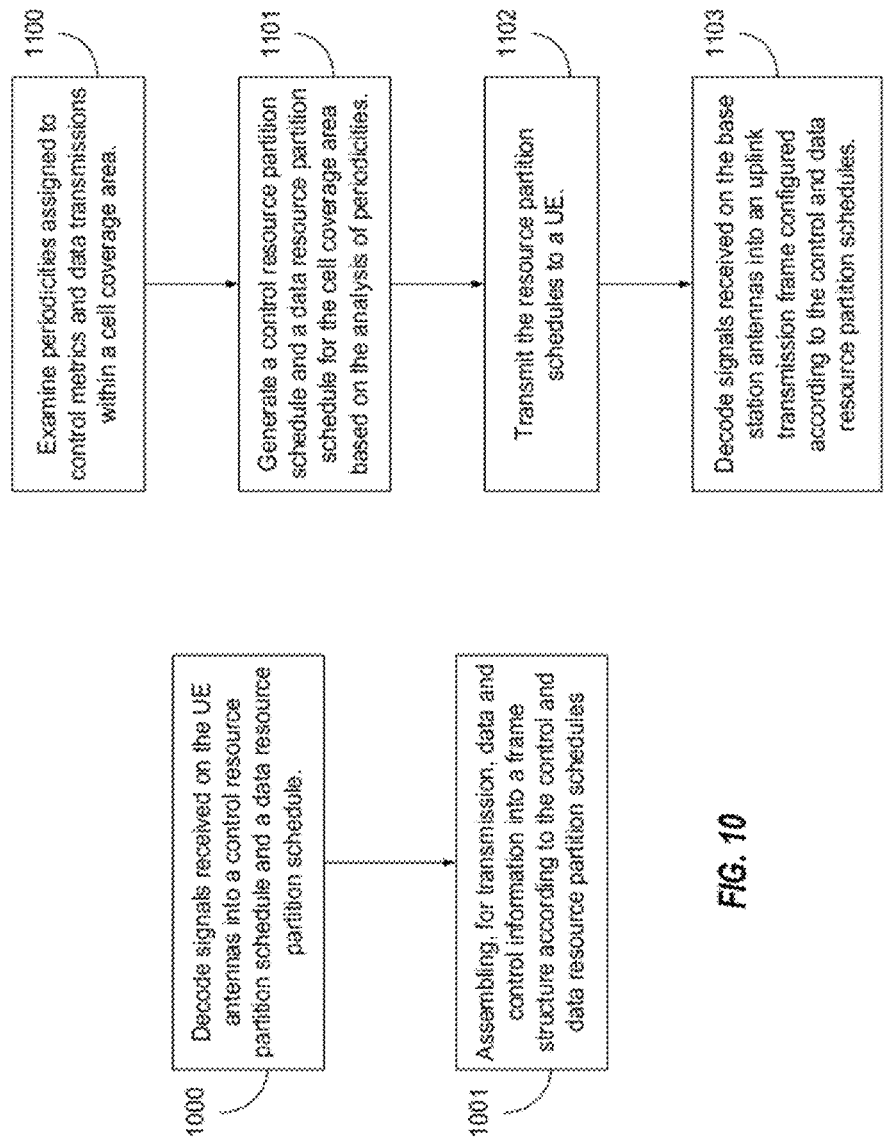

SEPARATE RESOURCE PARTITIONING MANAGEMENT FOR UPLINK CONTROL AND UPLINK DATA SIGNALS

CROSS-REFERENCE TO RELATED APPLICATIONS

This application claims the benefit of U.S. Provisional Patent Application No. 61/322,228, entitled, "APPARATUS AND METHOD FOR SEPARATE RESOURCE PARTIONING MANAGEMENT FOR UPLINK CONTROL AND UPLINK DATA SIGNALS", filed on Apr. 8, 2010, which is expressly incorporated by reference herein in its entirety.

BACKGROUND

1. Field

Aspects of the present disclosure relate generally to wireless communication systems, and more particularly, to separate resource partitioning management for uplink control and uplink data signals.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are related to transmission management that provides for separate resource partitioning management for control and data transmissions. A base station generates two separate resource partition schedules for the transmission stream, in which the first schedule is used for data transmissions while the second schedule is used for control signal transmissions. The two separate schemes may have different periodicities or different subframe type assignments that benefit either data or control transmissions or that allow for coordination of both data and control. The base stations may broadcast the different schedules in regular system information messages. The UEs served by these base stations will configure its data and control signal transmissions according to the appropriate resource partition schedules.

In one aspect of the disclosure, a method of wireless communication that includes generating a first resource partition schedule for at least one UL control signal, generating a second resource partition schedule for at least one UL data signal, the first and second resource partition applicable to a same transmission frame structure, transmitting the first resource partition schedule and the second resource partition schedule to a UE, and receiving a transmission frame from the UE, the transmission frame according to the first resource partition and the second resource partition.

In one aspect of the disclosure, a method of wireless communication that includes generating a method for wireless communication including receiving a control resource partition schedule from a serving cell, receiving a data resource partition schedule from the serving cell, and transmitting a signal, including control signals according to the control resource partition schedule and data signals according to the control resource partition schedule.

In an additional aspect of the disclosure, a base station configured for wireless communication includes means for generating a first resource partition schedule for at least one UL control signal, means for generating a second resource partition schedule for at least one UL data signal, the first and second resource partition applicable to a same transmission frame structure, means for transmitting the first resource partition schedule and the second resource partition schedule to a UE, and means for receiving a transmission frame from the UE, the transmission frame according to the first resource partition and the second resource partition.

In an additional aspect of the disclosure, a UE configured for wireless communication includes means for receiving a control resource partition schedule from a serving cell, means for receiving a data resource partition schedule from the serving cell, and means for transmitting a signal, including control signals according to the control resource partition schedule and data signals according to the control resource partition schedule.

In an additional aspect of the disclosure, a computer program product has a computer-readable medium having program code recorded thereon. This program code includes code to generate a first resource partition schedule for at least one UL control signal, code to generate a second resource partition schedule for at least one UL data signal, the first and second resource partition applicable to a same transmission frame structure, code to transmit the first resource partition schedule and the second resource partition schedule to a UE, and code to receive a transmission frame from the UE, the transmission frame according to the first resource partition and the second resource partition.

In an additional aspect of the disclosure, a computer program product has a computer-readable medium having program code recorded thereon. This program code includes code to receive a control resource partition schedule from a serving cell, code to receive a data resource partition schedule from the serving cell, and code to transmit a signal, including control signals according to the control resource partition schedule and data signals according to the control resource partition schedule.

In an additional aspect of the disclosure, a base station includes at least one processor and a memory coupled to the processor. The processor is configured to generate a first resource partition schedule for at least one UL control signal, to generate a second resource partition schedule for at least one UL data signal, the first and second resource partition applicable to a same transmission frame structure, to transmit the first resource partition schedule and the second resource partition schedule to a UE, and to receive a transmission frame from the UE, the transmission frame according to the first resource partition and the second resource partition.

In an additional aspect of the disclosure, a UE includes at least one processor and a memory coupled to the processor. The processor is configured to receive a control resource partition schedule from a serving cell, to receive a data resource partition schedule from the serving cell, and to transmit a signal, including control signals according to the control resource partition schedule and data signals according to the control resource partition schedule.

BRIEF DESCRIPTION OF THE DRAWINGS

FIG. 7B is a block diagram illustrating a transmission stream having dual resource partitioning schedules according to another aspect of the disclosure.

FIG. 7C is a block diagram illustrating a transmission stream having dual resource partitioning schedules according to another aspect of the disclosure.

FIG. 8 is a functional block diagram illustrating example blocks executed to implement one aspect of the present disclosure.

FIG. 9 is a functional block diagram illustrating example blocks executed to implement one aspect of the present disclosure.

FIG. 10 is a functional block diagram illustrating example blocks executed to implement one aspect of the present disclosure.

FIG. 11 is a functional block diagram illustrating example blocks executed to implement one aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
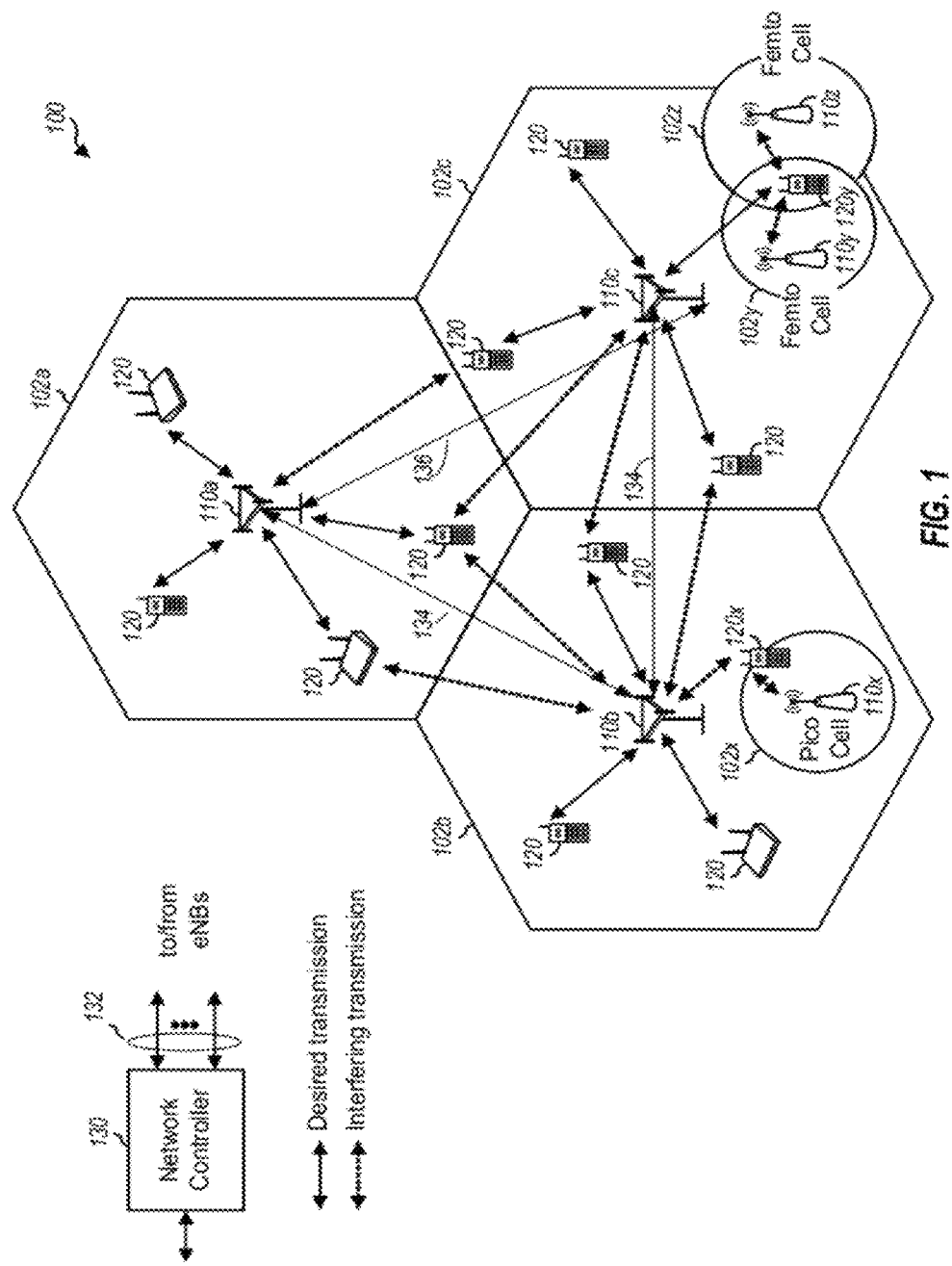
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, or 20 MHz, respectively.

Figure 2:
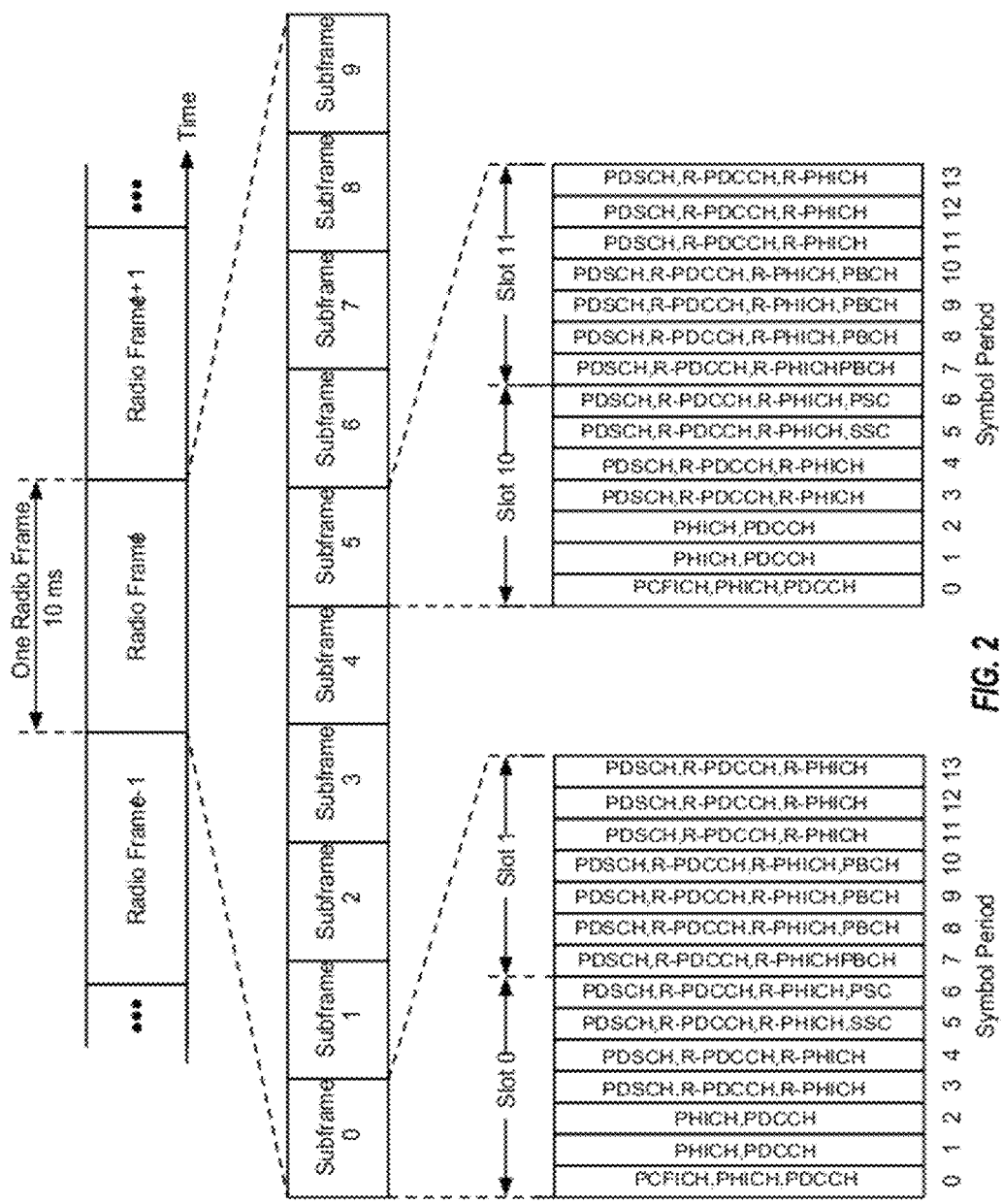
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) is included in the later symbol periods of each subframe. In addition, Relay-Physical HARQ Indicator Channel (R-PHICH) may also be included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
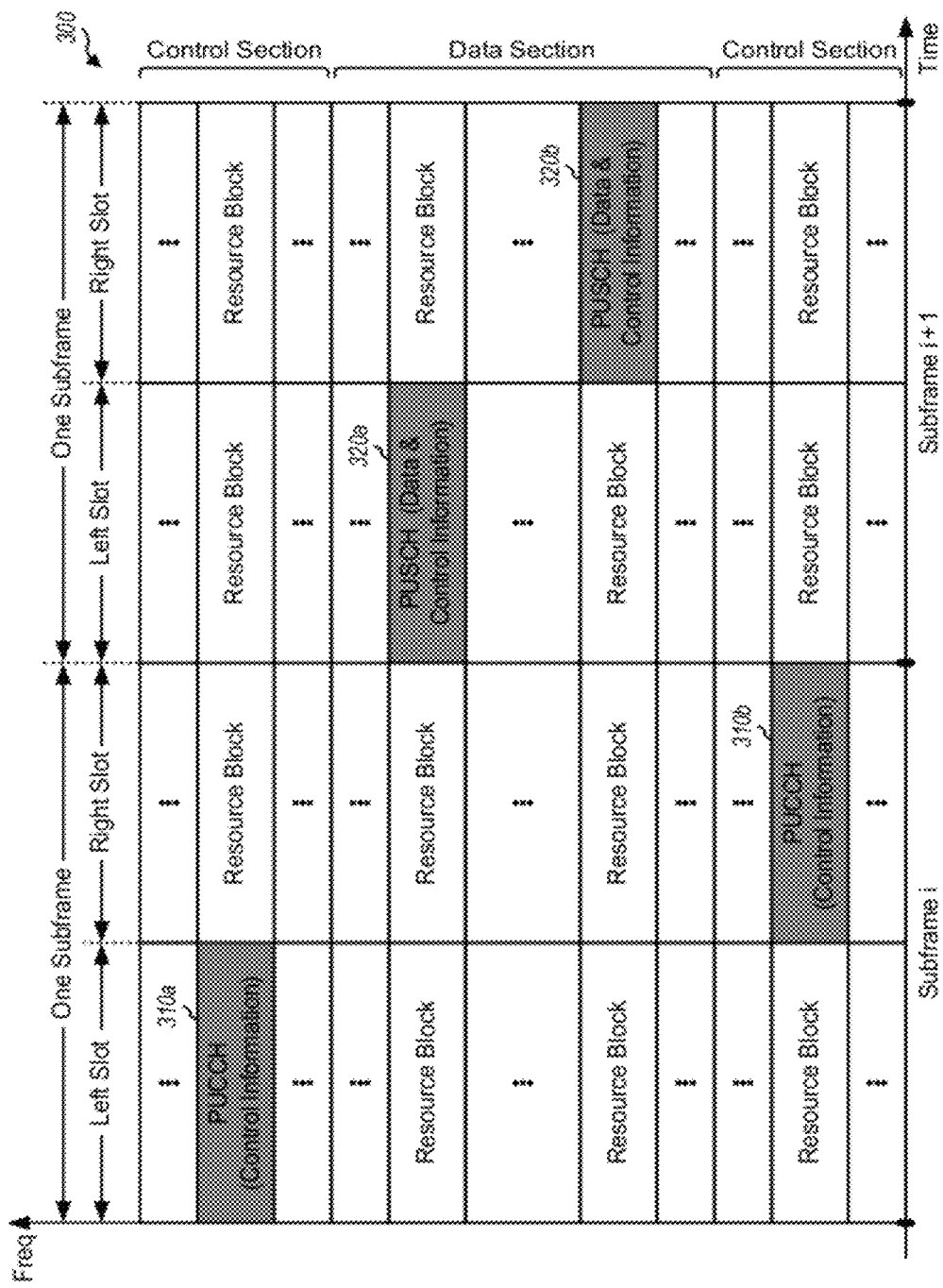
FIG. 3 is a block diagram conceptually illustrating an exemplary frame structure in uplink LTE/-A communications.

FIG. 3 is a block diagram conceptually illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, and femto eNBs) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources equally between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes in both uplink and downlink transmission may be allocated between three classes of subframes: protected subframes (U subframes), prohibited subframes (N subframes), and flexible subframes (X subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AX subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
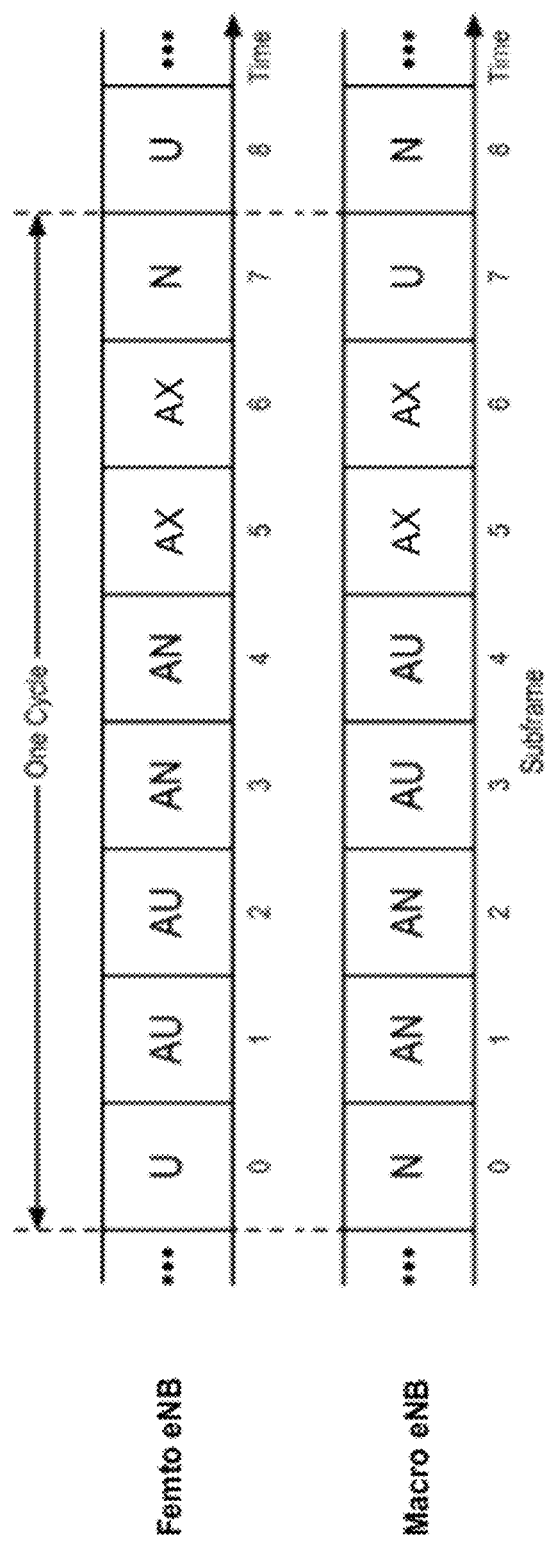
FIG. 4 is a block diagram conceptually illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and flexible subframes (AX). During the dynamically assigned flexible subframes (AX) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Flexible subframes (such as X/AX subframes) have a channel quality dependent on the number of neighbor eNBs transmitting data. For example, if neighbor eNBs are transmitting data on the flexible subframes, the channel quality of the flexible subframes may be lower than the protected subframes. Channel quality on flexible subframes may also be lower for extended boundary area (EBA) UEs strongly affected by aggressor eNBs. An EBA UE may belong to a first eNB but also be located in the coverage area of a second eNB. For example, a UE communicating with a macro eNB that is near the range limit of a femto eNB coverage is an EBA UE.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120$y$ may be close to the femto eNB 110$y$ and may have high received power for the eNB 110$y$. However, the UE 120$y$ may not be able to access the femto eNB 110$y$ due to restricted association and may then connect to the macro eNB 110$c$ (as shown in FIG. 1) or to the femto eNB 110$z$ also with lower received power (not shown in FIG. 1). The UE 120$y$ may then observe high interference from the femto eNB 110$y$ on the downlink and may also cause high interference to the eNB 110$y$ on the uplink. Using coordinated interference management, the eNB 110$c$ and the femto eNB 110$y$ may communicate over the backhaul 134 to negotiate resources. In the negotiation, the femto eNB 110$y$ agrees to cease transmission on one of its channel resources, such that the UE 120$y$ will not experience as much interference from the femto eNB 110$y$ as it communicates with the eNB 110$c$ over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 µs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 5:
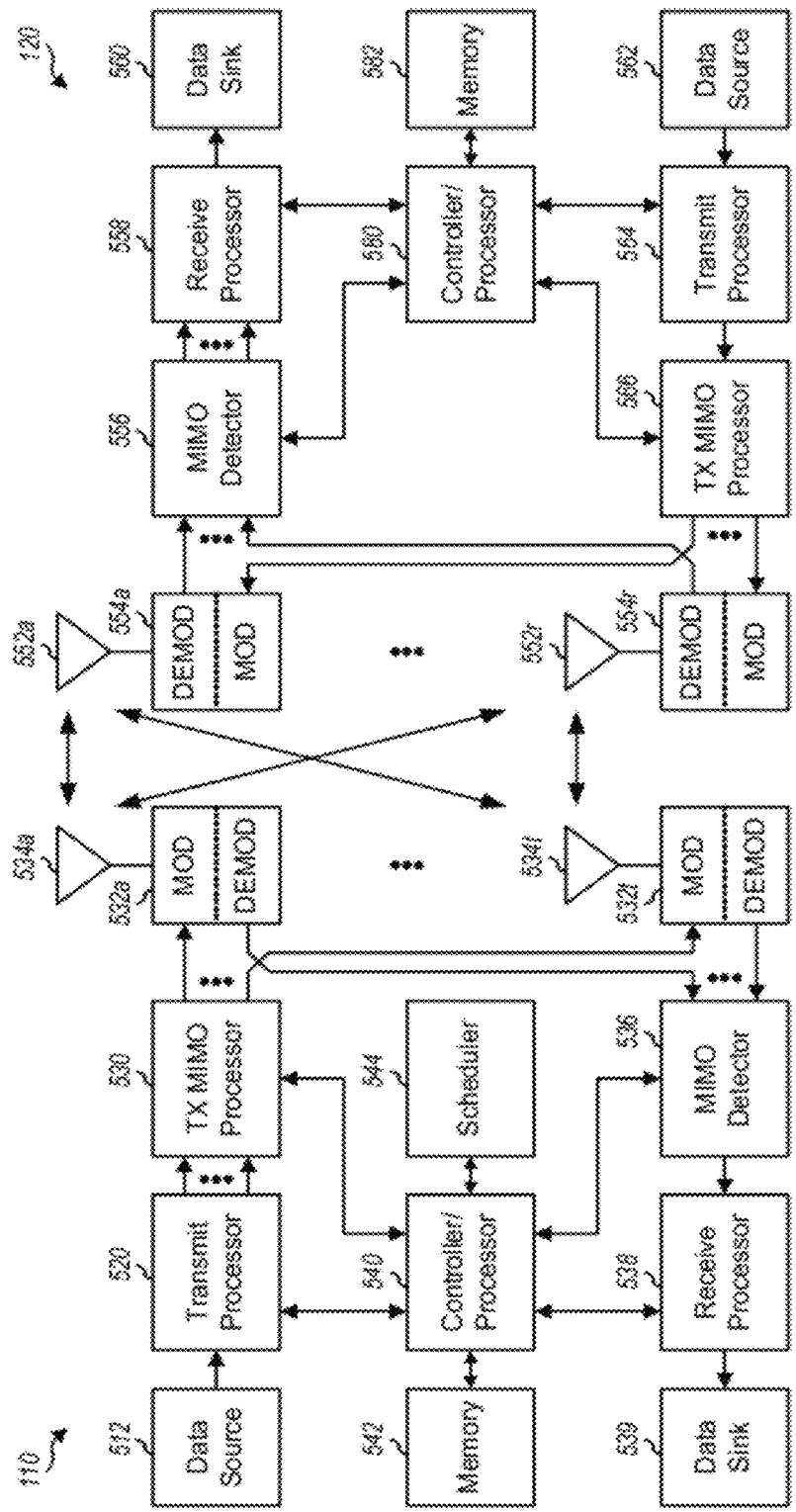
FIG. 5 is a block diagram conceptually illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 534a through 534t, and the UE 120 may be equipped with antennas 552a through 552r.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The transmit processor 520 may process (e.g., encode and symbol map) the data and control information to obtain data symbols and control symbols, respectively. The transmit processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The transmit processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the eNB 110 and the UE 120, respectively. The controller/processor 540 and/or other processors and modules at the eNB 110 may perform or direct the execution of various processes for the techniques described herein. The controllers/processor 580 and/or other processors and modules at the UE 120 may also perform or direct the execution of the functional blocks illustrated in FIGS. 8 and 9, and/or other processes for the techniques described herein. The memories 542 and 582 may store data and program codes for the eNB 110 and the UE 120, respectively. A scheduler 544 may schedule UEs for data transmission on the downlink and/or uplink including establishing the resource partition schedule or schedules for the cell coverage area.

To better protect control and/or data transmissions from overwhelming interference (for example, in the downlink, uplink, or both directions), it may be advantageous, as noted before, to perform interference management, e.g., via resource partitioning, between different node power classes. In one example, a time-domain (time division duplex (TDD) based resource partitioning for the uplink (UL), three UL subframe types are defined as usable "U" subframes, which, for a given cell, are typically free of interference from cell of different classes; non-usable "N" subframes, which are typically not used by a given cell in order to avoid excessive interference to cells of different classes; and the flexible "X" subframes, which can be used flexibly based on eNB implementation.

In one example, UEs aware of the management of subframe types can typically transmit in "U" subframes for best protection. These UEs should also avoid transmitting using "N" subframes at least on a best-effort basis to avoid excessive interference. These UEs may or may not use "X" subframes, depending on the decisions by the given cell. In other words, an example may be that "U" subframes are expected to be the most used, "N" subframes are expected to be the least used or never used, and "X" subframes may or may not be used.

In another example, uplink hybrid automatic repeat request (H-ARQ) operation is synchronous and follows a fixed timing relationship. In particular, for frequency division duplex (FDD) systems, a fixed 8 ms H-ARQ round trip time (RTT) is specified, which comprises two parts: (1) a fixed 4 ms between PDCCH or PHICH and PUSCH transmission, and (2) another fixed 4 ms between PUSCH transmission and the next PDCCH or the next PHICH. In one aspect, for LTE-A, although it is possible that such 8 ms based H-ARQ RTT may be changed, it is still preferable to maintain the same 8 ms H-ARQ RTT as much as possible.

In another aspect, in light of the UL H-ARQ operation, particularly for backward compatibility, a 8 ms periodicity based on resource partitioning for UL is desirable. For example, one may configure UL resource partitioning for two power classes as [U,X,X,X,N,X,X,X] for the first class, and [N,X,X,X,U,X,X,X] for the second class, where each class follows 8 ms periodicity and the two classes have complementary "U" and "N" subframe configurations.

Some UL control signals are designed with periodicities not fully compatible with a 8 ms periodicity. Here, "compatibility" is defined such that given a periodicity defined for a control signal, the transmission of the control signal can be guaranteed to be completely contained in the protected subframe type, e.g., "U" subframe. In particular, for periodic channel quality indicator/precoding matrix indicator (CQI/PMI) reporting, the periodicities may be 2, 5, 10, 20, 40, 80, 160, 32, 64, 128 ms where 5, 10, 20 ms are not compatible with the 8 ms periodicity. For periodic rank indicator (RI) reporting, the periodicities may be integer multiples of CQI, where the integer can take values of 1, 2, 4, 8, 16, 32. For some combination of CQI periodicity and the integer multiples, the resulting RI periodicity may not be compatible with the 8 ms based resource partitioning as well. Scheduling requests (SR) may be configured with a periodicity of 1, 2, 5, 10, 20, 40, 80 ms, where 5, 10, 20 ms are not compatible with a 8 ms periodicity. For semi-persistent scheduling, ACK/NAK resources may be semi-statically configured by higher network layers and may have a periodicity of 10, 20, 32, 40, 64, 80, 128, 160, 320, 640 ms, where 10, 20 ms are not compatible with 8 ms periodicity. In yet another example, Voice over IP (VoIP) services typically use 20 ms periodicity.

In another aspect, the incompatibility of the 8 ms based UL resource partitioning and some periodicities for some UL control signal may cause some control signals to be forced to use larger periodicities, which may have negative performance impact. For example, slower CQI reporting may impact downlink performance; larger SR periodicity may result in a slower UL response. Control signals with incompatible periodicity configuration may also result in effective larger periodicity and/or unwanted UL transmissions. For instance, if a 5 ms CQI periodicity is configured, and if there is only one "U" subframe in the 8 ms based resource partitioning, effectively, the CQI reporting periodicity is 40 ms. For legacy UEs, which are unaware of the subframe type management, 80% (8 ms vs. 40 ms) of CQI transmissions are "unwanted" transmissions and may unnecessarily cause UL interference. Subsequently, the present disclosure discloses a solution to address the incompatibility issue.

In one example, separate resource partitioning management may be used for UL control and UL data. In particular, for UL PUSCH and dynamic ACK/NAK transmission, a first resource partitioning management is defined, while for periodic CQI/PMI/RI, SR and semi-persistent scheduling (SPS) ACK/NAKs, a second resource partitioning management is defined.

Figure 6:
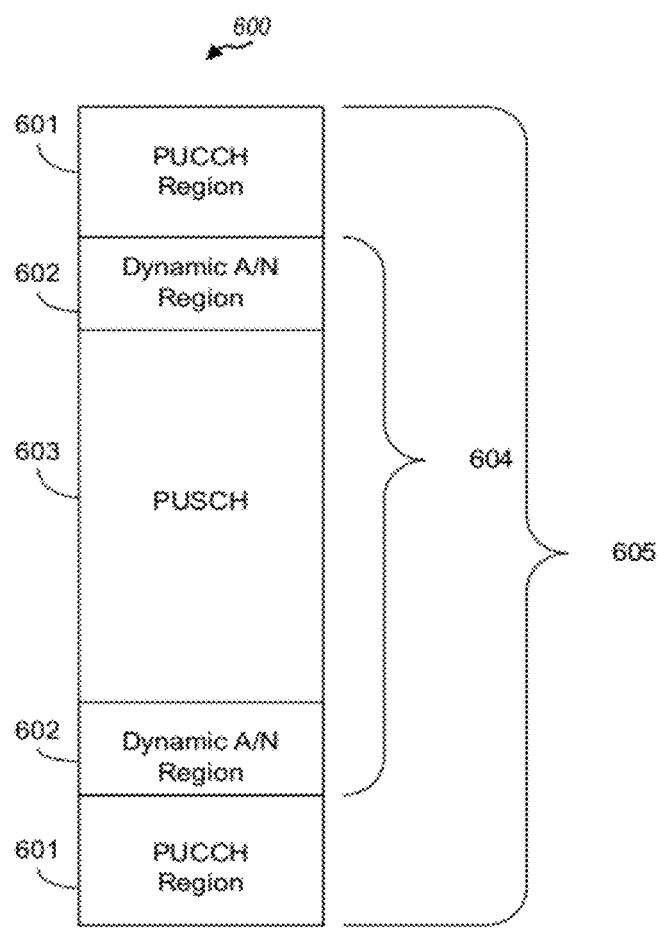
FIG. 6 illustrates an example of separate resource partitioning management for UL control and UL data.

In one aspect, a resource partitioning management may be in the form of periodicity, categorization of subframe types, etc. For instance, the first resource partitioning is 8 ms based, while the second resource partitioning is 10 ms based. FIG. 6 illustrates a subframe 600 with an example separate resource partitioning management schedule for UL control and UL data. In this example, a first resource partition 604 includes allocations for the PUSCH 603 and dynamic ACK/NAK region 602 transmissions. A second resource partition 605 includes allocations for the PUCCH regions 601. The first resource partition 604 is based on a periodicity that is different from the periodicity of the second resource partition 605. For example, the first resource partition 604 may be based on an 8 ms periodicity, while the second resource partition 605 is based on a 10 ms periodicity.

The dynamic ACK/NACK region 602 is configured such that it may be reused by the data region, the PUSCH region 603, when there are no SPS ACK/NACK messages transmitted. Thus, additional resource blocks may be used by the PUSCH region 603 when there is no current transmission of SPS ACK/NACK messages, thus, increasing the data bandwidth over the subframe.

In another aspect, the presently disclosed resource partition management paradigm may include some of the following features. For example, it may also be possible to categorize SPS ACK/NAKs based on the first resource partition 604. The second resource partition 605 may also be a superset of the first one. For example, the first resource partition 604 can be based on a 8 ms periodicity, while the second resource partition 605 can be based on a 40 ms periodicity (bitmap), which is a least common multiple of 8 ms and 10 ms. For example, the second resource partition 605 periodicity may also be broadcast, potentially in the same system information block (SIB) as the first resource partition 604.

In another example, the first resource partition 604 and the second resource partition 605 may have the same periodicity, but different categorizations of different subframe types. For instance, due to load considerations across different nodes, only one "U" subframe is configured, for example, every 8 ms for UL data, and more than one "U" subframe can be configured with the same 8 ms periodicity for UL control in order to allow for low-latency CQI reports.

Figure 7A:
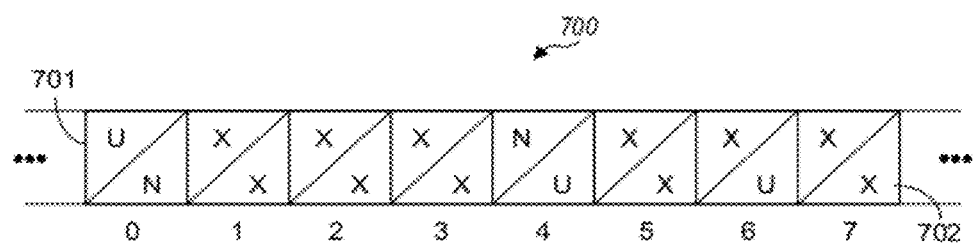
FIG. 7A is a block diagram illustrating a transmission stream having dual resource partitioning schedules applied thereto according to one aspect of the disclosure.

FIG. 7A is a block diagram illustrating a transmission stream 700 having dual resource partitioning schedules applied thereto according to one aspect of the disclosure. The transmission stream 700 has a first resource partition schedule 701 for data and a second resource partition schedule 702 for control signals applied. The periodicities for each of the first and second resource partition schedules 701 and 702 are the same. However, the subframe class assignments are different between the two schedules. For example, in the first resource partition schedule 701, a usable "U" subframe is scheduled for data transmission at subframe 0, while a non-usable "N" subframe is scheduled in the second resource partition schedule 702 for control signals. Similarly, in the second resource partition schedule 702, two usable "U" subframes are scheduled in subframes 4 and 6, while a non-usable subframe "N" is scheduled for subframe 4 and a flexible "X" is scheduled in subframe 6 of the first resource partition schedule. As noted above, the configuration with multiple "U" subframes scheduled for control signals allows for low-latency CQI reports.

Figures 7B, 7C:
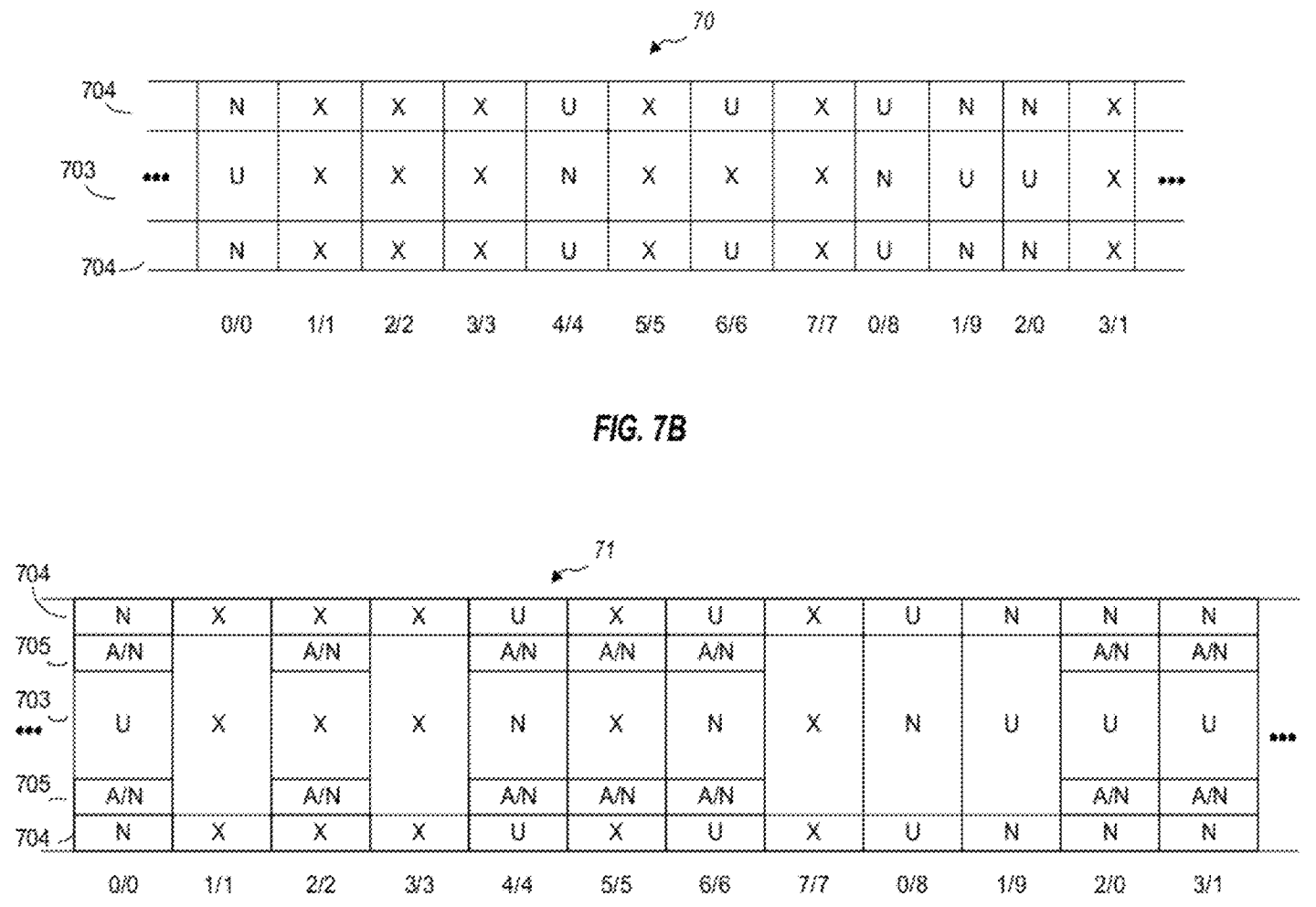

FIG. 7B is a block diagram illustrating a transmission stream 70 having dual resource partitioning schedules according to another aspect of the disclosure. The transmission stream 70 is shown divided between the control regions 704 and data region 703. A first resource partition schedule is applied to the control region 704 and a second resource partition schedule is applied to the data region 703, as illustrated by each subframe of each region having a separate subframe classification scheme. In addition to the separate resource partition schedules applied to the control region 704 and data region 703, the control region 704 has a periodicity of 10 ms while the data region 703 has a periodicity of 8 ms. At subframe 0/8, the data region 703 is assigned a non-usable "N" subframe, which represents the first subframe of a new frame for the data region 703, and the control region 704 is assigned a usable "U" subframe, which represents the ninth subframe of the first frame shown for the control region 704.

FIG. 7C is a block diagram illustrating a transmission stream 71 having dual resource partitioning schedules according to another aspect of the disclosure. The transmission stream 71 is illustrated as divided with the control region 704 and the data region 703, but also illustrates a dynamic ACK/NACK region 705. As with the transmission stream 70 (FIG. 7B), transmission stream 71 ACK/NACK signals are not constantly transmitted. Therefore, the dynamic ACK/NACK region 705 will not always be used. For example, ACK/NACK signals are transmitted in the dynamic ACK/NACK region 705 of the control region 704 in subframe 2/2, while no ACK/NACK signals are transmitted in the control region 704 in subframe 3/3. When no ACK/NACK signals are transmitted, the dynamic ACK/NACK region 705 of the control region 704 may be reclaimed by the data region 703 in order to transmit more data. Therefore, the dynamic ACK/NACK region 705 is a flexible region that accommodates the schedule of ACK/NACK signals and allows for increased data transmission in the data region 703 when no ACK/NACK signals are present.

In operation from the eNB perspective, the separate resource partition schedules are generated and broadcasted within the served cell. FIG. 8 is a functional block diagram illustrating example blocks executed to implement one aspect of the present disclosure.

In block 800, an eNB generates a first resource partition schedule for at least one UL control signal. A second resource partition schedule is generated, in block 801, for at least one UL data signal, where the first and second resource partition are applicable to the same transmission frame structure. The periodicities selected may be different or similar. For example, the first periodicity may be based on 10 ms, while the second is based on 8 ms, or vice versa. The selected periodicities may correlate to the preferred periodicities of the information transmitted. As set forth above, different types of information benefit from or are limited to the different periodicities may be transmitted on the appropriate partition at the proper periodicity. In one example, the partitions may be separated between the standard control and data regions in a LTE/-A frame. However, it is not limited thereto. Furthermore, the partitions may also be divided to provide for a dynamic or semi-persistent ACK/NACK partition.

In block 802, the first and second resource partition schedules are transmitted to a UE. For example, the partition schedules may be located in the SIB transmission. Alternatively, the schedule may be placed in an alternative SIB, MIB, or be placed in another control transmission structure.

The eNB then receives a transmission frame, in block 803, from the UE, where the transmission frame is configured according to the first resource partition schedule and the second resource partition schedule. For example, the frame structure may conform to the uplink structure in LTE/-A or another uplink transmission scheme, partitioned as set forth above.

From the perspective of the UE, the UE monitors normal system broadcasts for system information. FIG. 9 is a functional block diagram illustrating example blocks executed to implement one aspect of the present disclosure.

In block 900, the UE receives a control resource partition schedule from a serving cell. It receives a data resource partition schedule, in block 901, from the serving cell. Using the two received schedules, the UE transmits a signal, in block 902, including control signals, according to the control resource partition schedule and data signals according to the control resource partition schedule. As set forth above, the scheduling information for the control and data partitions may be located in the SIB transmission. Alternatively, the schedule may be placed in an alternative SIB, MIB, or be placed in another control transmission.

In one configuration, the UE 120 configured for wireless communication includes means for receiving a control resource partition schedule from a serving cell, means for receiving a data resource partition schedule from said serving cell, and means for transmitting a signal, including control signals according to said control resource partition schedule and data signals according to said control resource partition schedule. In one aspect, the aforementioned means may be the processor(s), the controller/processor 580, the memory 582, the receive processor 558, the MIMO detector 556, the demodulators 554a, and the antennas 552a configured to perform the functions recited by the aforementioned means.

FIG. 10 is a functional block diagram illustrating example blocks executed to implement one aspect of the present disclosure. In block 1000, signals received on the UE antennas are decoded into a control resource partition schedule and a data resource partition schedule. For example, with reference to UE 120 of FIG. 5, signals are received on antennas 552a-552r. The signals are then demodulated by the demodulators 554a-554r. The MIMO detector 556 assembles the spatially processed, demodulated signals into the encoded information in the signal. The receive processor 558 decodes the information and transfers the resource partition schedules to the controller/processor 540 for further control processing and then are stored in the memory 582 while the UE 120 remains in the coverage area subject to the resource partitions. Thus, the UE receives a resource partition schedule for control signals and another resource partition schedule for data signals.

In block 1001, using the control and data resource partition schedule, the UE assembles it data and control information into a corresponding frame structure for transmission. For example, when data in the data source 562 is ready to transmit, and the controller/processor 580 had control signals for transmission, such as channel quality indicators (CQI), precoding matrix indicators (PMI), rank indicators (RI), scheduling requests (SR), and the like, the data and control information are input to the transmit processor 564 along with the resource scheduling to arrange the data and control information within the transmission frame. The transmit processor 564 encodes the transmission information. The encoded information is then spatially processed by the transmit MIMO processor 566 and then modulated by the modulators 554a-554r. The modulated signal is then transmitted over the air through antennas 552a-552r. Thus, the UE generates a signal for transmission in which the control signals are arranged according to the control resource partition schedule and the data signals are arranged according to the data resource partition schedule.

In another configuration, the eNB 110 configured for wireless communication includes means for generating a first resource partition schedule for at least one uplink (UL) control signal, means for generating a second resource partition schedule for at least one UL data signal, said first and second resource partition applicable to a same transmission frame structure, means for transmitting said first resource partition schedule and said second resource partition schedule to a UE, and means for receiving a transmission frame from the UE, the transmission frame according to the first resource partition and the second resource partition. In one aspect, the aforementioned means may be the processor(s), the controller/processor 540, the scheduler 544, the memory 542, the transmit processor 520, the transmit MIMO processor 530, the modulators 532a, and the antennas 534a configured to perform the functions recited by the aforementioned means. In another aspect, the aforementioned means may be a module or any apparatus configured to perform the functions recited by the aforementioned means.

FIG. 11 is a functional block diagram illustrating example blocks executed to implement one aspect of the present disclosure. In block 1100, periodicities assigned to control metrics are analyzed in relation to periodicities related to data transmission. For example, with reference to eNB 110 of FIG. 5, the controller/processor 540 accesses the assigned periodicities stored in memory 542.

The base station generates resource partition schedules, in block 1101, for control transmissions and data transmissions based on the analysis of the periodicities. For example, the scheduler 544 of eNB 110 uses the examination of periodicities performed by the controller/processor 540 and generates resource partition schedules for the data and control transmissions that do not diminish uplink performance. Thus, based on the analysis of the periodicities within the cell, the base station generates more than one resource partition schedule for the same cell coverage area.

The resource partition schedules are transmitted to the UE, in block 1102. The controller/processor 540 communicates the resource partition schedules to the transmit processor 520. The transmit processor 520 encodes the information after which the transmit MIMO processor 530 performs spatial processing prior to modulation at the modulators 532a-532t. The modulated signals are then transmitted over the air via antennas 534a-534t.

In block 1103, signals received on the base station antennas are decoded into an uplink transmission frame structure configured according to the multiple resource partition schedules. For example, the antennas 534a-534t receive the signals transmitted from the UE. The signals are demodulated by the demodulators 532a-532t. The MIMO detector 536 assembles the spatially processed signals into the encoded information in the signal. The receive processor 538 decodes the information and transfers the data to the data sink 539 and the control information to the controller/processor 540 for further control processing. Thus, the data is transmitted within the frame received by the eNB 110 according to one of the resource partition schedules, and the control information is transmitted within the frame according to the other resource partition schedule. Therefore, the base station receives a transmission frame from the UE, in which the transmission frame is configured according to the resource partition schedules.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8 and 9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
generating a first resource partition schedule for at least one uplink (UL) control signal;
generating a second resource partition schedule for at least one UL data signal, said first and second resource partition schedules applicable to a same transmission frame structure;
transmitting said first resource partition schedule and said second resource partition schedule to a user equipment (UE); and receiving a transmission frame from said UE, said transmission frame configured according to said first resource partition schedule and said second resource partition schedule, wherein said first resource partition schedule uses a first subframe class assignment configuration specifying one of a plurality of subframe classes for each of a plurality of subframes for the at least one UL control signal, and said second resource partition schedule uses a second subframe class assignment configuration specifying one of the plurality of subframe classes for each of a plurality of subframes for the at least one UL data signal, wherein the plurality of subframe classes indicate whether a respective subframe is potentially interfered by one or more neighbor base stations, and wherein said second subframe class assignment configuration is different from said first subframe class assignment configuration.

2. The method of claim 1 wherein said first resource partition schedule is based on a first periodicity and said second resource partition schedule is based on a second periodicity different from said first periodicity.

3. The method of claim 2 wherein said first periodicity and said second periodicity are multiples of one another.

4. The method of claim 1 wherein said first and second resource partitions have a same periodicity.

5. The method of claim 1 further comprising:
broadcasting schedules of said first and second resource partitions in a system information block (SIB) message.

6. The method of claim 1 further comprising:
dividing transmission frame structures, to which said first and second resource partitions are applicable, into three regions comprising:
a semi-persistent control region reserved at a first frequency edge and a second frequency edge of each of said transmission frame structures;
a data region having a second set of RBs reserved in a middle section of each of said transmission frame structures; and
a dynamic control region having a third set of RBs reserved between said data region and said semi-persistent control region at each of said first frequency edge and said second frequency edge.

7. The method of claim 6 wherein said dynamic control region may be used for data transmission when no dynamic control signals are transmitted.

8. A method for wireless communication, comprising:
receiving a control resource partition schedule from a serving cell;
receiving a data resource partition schedule from said serving cell; and
transmitting control signals according to said control resource partition schedule and transmitting data signals according to said data resource partition schedule,
wherein said control resource partition schedule uses a first subframe class assignment configuration specifying one of a plurality of subframe classes for each of a plurality of subframes of the control signals, and said data resource partition schedule uses a second subframe class assignment configuration specifying one of the plurality of subframe classes for each of a plurality of subframes of the data signals, wherein the plurality of subframe classes indicate whether a respective subframe is potentially interfered by one or more neighbor base stations, and wherein said second subframe class assignment configuration is different from said first subframe class assignment configuration.

9. The method of claim 8 wherein said control resource partition schedule is based on a first periodicity and said data resource partition schedule is based on a second periodicity different from said first periodicity.

10. The method of claim 9 wherein said first periodicity and said second periodicity are multiples of one another.

11. The method of claim 8 wherein said control resource partition schedule and said data resource partition schedule have a same periodicity.

12. The method of claim 8 wherein said control resource partition schedule and said data resource partition schedule are received in a same system information block (SIB) message.

13. The method of claim 8 wherein transmission frame structures, to which said control resource partition schedule and said data resource partition schedule are applicable, are divided into three regions comprising:
a semi-persistent control region having a first set of resource blocks (RBs) reserved on a beginning edge and ending edge of each of said transmission frame structures;
a data region having a second set of RBs reserved in a middle section of each of said transmission frame structures; and
a dynamic control region having a third set of RBs reserved between said data region and said semi-persistent control region at each of said beginning and said ending edges.

14. The method of claim 13 wherein said control signals comprise one or more of: semi-persistent control signals and dynamic control signals.

15. The method of claim 14
wherein said transmitting said control signals comprises:
transmitting said semi-persistent control signals in said semi-persistent control region;
transmitting said dynamic control signals, when present, in said dynamic control region; and
wherein said transmitting said data signals comprises:
transmitting said data signals in said data region.

16. The method of claim 15 wherein, when said dynamic control signals are not present, said transmitting said data signals further comprises:
transmitting said data signals in said dynamic control region.

17. A base station configured for wireless communication, comprising:
means for generating a first resource partition schedule for at least one uplink (UL) control signal;
means for generating a second resource partition schedule for at least one UL data signal, said first and second resource partition schedules applicable to a same transmission frame structure;
means for transmitting said first resource partition schedule and said second resource partition schedule to a user equipment (UE); and
means for receiving a transmission frame from said UE, said transmission frame configured according to said first resource partition schedule and said second resource partition schedule,
wherein said first resource partition schedule uses a first subframe class assignment configuration specifying one of a plurality of subframe classes for each of a plurality of subframes for the at least one UL control signal, and said second resource partition schedule uses a second subframe class assignment configuration specifying one of the plurality of subframe classes for each of a plurality of subframes for the at least one UL data signal, wherein the plurality of subframe classes indicate whether a respective subframe is potentially interfered by one or more neighbor base stations, and wherein said second subframe class assignment configuration is different from said first subframe class assignment configuration.

18. The base station of claim 17 wherein said first resource partition schedule is based on a first periodicity and said second resource partition schedule is based on a second periodicity different from said first periodicity.

19. The base station of claim 17 wherein said first and second resource partitions have a same periodicity.

20. The base station of claim 17 further comprising:
means for broadcasting schedules of said first and second resource partitions in a system information block (SIB) message.

21. The base station of claim 17 further comprising:
means for dividing transmission frame structures, to which said first and second resource partitions are applicable, into three regions comprising:
a semi-persistent control region reserved at a first frequency edge and a second frequency edge of each of said transmission frame structures;
a data region having a second set of RBs reserved in a middle section of each of said transmission frame structures; and
a dynamic control region having a third set of RBs reserved between said data region and said semi-persistent control region at each of said first frequency edge and said second frequency edge.

22. The base station of claim 21 wherein said dynamic control region may be used for data transmission when no dynamic control signals are transmitted.

23. A user equipment (UE) configured for wireless communication, comprising:
means for receiving a control resource partition schedule from a serving cell;
means for receiving a data resource partition schedule from said serving cell; and
means for transmitting control signals according to said control resource partition schedule and transmitting data signals according to said data resource partition schedule,
wherein said control resource partition schedule uses a first subframe class assignment configuration specifying one of a plurality of subframe classes for each of a plurality of subframes of the control signals, and said data resource partition schedule uses a second subframe class assignment configuration specifying one of the plurality of subframe classes for each of a plurality of subframes of the data signals, wherein the plurality of subframe classes indicate whether a respective subframe is potentially interfered by one or more neighbor base stations, and wherein said second subframe class assignment configuration is different from said first subframe class assignment configuration.

24. The UE of claim 23 wherein said control resource partition schedule is based on a first periodicity and said data resource partition schedule is based on a second periodicity different from said first periodicity.

25. The UE of claim 24 wherein said first periodicity and said second periodicity are multiples of one another.

26. The UE of claim 23 wherein said control resource partition schedule and said data resource partition schedule have a same periodicity.

27. The UE of claim 23 wherein said control resource partition schedule and said data resource partition schedule are received in a same system information block (SIB) message.

28. The UE of claim 23 wherein transmission frame structures, to which said control resource partition schedule and said data resource partition schedule are applicable, are divided into three regions comprising:
a semi-persistent control region having a first set of resource blocks (RBs) reserved on a beginning edge and ending edge of each of said transmission frame structures;
a data region having a second set of RBs reserved in a middle section of each of said transmission frame structures; and
a dynamic control region having a third set of RBs reserved between said data region and said semi-persistent control region at each of said beginning and said ending edges.

29. The UE of claim 28 wherein said control signals comprise one or more of: semi-persistent control signals and dynamic control signals.

30. The UE of claim 29
wherein said means for transmitting said control signals comprises:
means for transmitting said semi-persistent control signals in said semi-persistent control region;
means for transmitting said dynamic control signals, when present, in said dynamic control region; and
wherein said means for transmitting said data signals comprises:
means for transmitting said data signals in said data region.

31. The UE of claim 30 wherein, when said dynamic control signals are not present, said means for transmitting said data signals further comprises:
means for transmitting said data signals in said dynamic control region.

32. A computer program product for wireless communications in a wireless network, comprising:
a non-transitory computer-readable medium having program code recorded thereon, said program code comprising:
program code to generate a first resource partition schedule for at least one uplink (UL) control signal;
program code to generate a second resource partition schedule for at least one UL data signal, said first and second resource partition schedules applicable to a same transmission frame structure;
program code to transmit said first resource partition schedule and said second resource partition schedule to a user equipment (UE); and
program code to receive a transmission frame from said UE, said transmission frame configured according to said first resource partition schedule and said second resource partition schedule,
wherein said first resource partition schedule uses a first subframe class assignment configuration specifying one of a plurality of subframe classes for each of a plurality of subframes for the at least one UL control signal, and said second resource partition schedule uses a second subframe class assignment configuration specifying one of the plurality of subframe classes for each of a plurality of subframes for the at least one UL data signal, wherein the plurality of subframe classes indicate whether a respective subframe is potentially interfered by one or more neighbor base stations, and wherein said second subframe class assignment configuration is different from said first subframe class assignment configuration.

33. The computer program product of claim 32 wherein said first resource partition schedule is based on a first periodicity and said second resource partition schedule is based on a second periodicity different from said first periodicity.

34. The computer program of claim 32 further comprising:
program code to broadcast schedules of said first and second resource partitions in a system information block (SIB) message.

35. The computer program product of claim 32 further comprising:
program code to divide transmission frame structures, to which said first and second resource partitions are applicable, into three regions comprising:
a semi-persistent control region reserved at a first frequency edge and a second frequency edge of each of said transmission frame structures;
a data region having a second set of RBs reserved in a middle section of each of said transmission frame structures; and
a dynamic control region having a third set of RBs reserved between said data region and said semi-persistent control region at each of said first frequency edge and said second frequency edge.

36. A computer program product for wireless communications in a wireless network, comprising:
a non-transitory computer-readable medium having program code recorded thereon, said program code comprising:
program code to receive a control resource partition schedule from a serving cell;
program code to receive a data resource partition schedule from said serving cell; and
program code to transmit control signals according to said control resource partition schedule and transmit data signals according to said data resource partition schedule,
wherein said control resource partition schedule uses a first subframe class assignment configuration specifying one of a plurality of subframe classes for each of a plurality of subframes of the control signals, and said data resource partition schedule uses a second subframe class assignment configuration specifying one of the plurality of subframe classes for each of a plurality of subframes of the data signals, wherein the plurality of subframe classes indicate whether a respective subframe is potentially interfered by one or more neighbor base stations, and wherein said second subframe class assignment configuration is different from said first subframe class assignment configuration.

37. The computer program product of claim 36 wherein said control resource partition schedule is based on a first periodicity and said data resource partition schedule is based on a second periodicity different from said first periodicity.

38. The computer program product of claim 36 wherein said control resource partition schedule and said data resource partition schedule are received in a same system information block (SIB) message.

39. The computer program product of claim 36 wherein transmission frame structures, to which said control resource partition schedule and said data resource partition schedule are applicable, are divided into three regions comprising:
a semi-persistent control region having a first set of resource blocks (RBs) reserved on a beginning edge and ending edge of each of said transmission frame structures;
a data region having a second set of RBs reserved in a middle section of each of said transmission frame structures; and
a dynamic control region having a third set of RBs reserved between said data region and said semi-persistent control region at each of said beginning and said ending edges.

40. The computer program product of claim 39 wherein said control signals comprise one or more of: semi-persistent control signals and dynamic control signals.

41. The computer program product of claim 40
wherein said program code to transmit said control signals comprises:
program code to transmit said semi-persistent control signals in said semi-persistent control region;
program code to transmit said dynamic control signals, when present, in said dynamic control region; and
wherein said program code to transmit said data signals comprises:
program code to transmit said data signals in said data region.

42. A base station configured for wireless communication, said base station comprising
at least one processor; and
a memory coupled to said at least one processor,
wherein said at least one processor is configured:
to generate a first resource partition schedule for at least one uplink (UL) control signal;
to generate a second resource partition schedule for at least one UL data signal, said first and second resource partition schedules applicable to a same transmission frame structure;
to transmit said first resource partition schedule and said second resource partition schedule to a user equipment (UE); and
to receive a transmission frame from said UE, said transmission frame configured according to said first resource partition schedule and said second resource partition schedule,
wherein said first resource partition schedule uses a first subframe class assignment configuration specifying one of a plurality of subframe classes for each of a plurality of subframes for the at least one UL control signal, and said second resource partition schedule uses a second subframe class assignment configuration specifying one of the plurality of subframe classes for each of a plurality of subframes for the at least one UL data signal, wherein the plurality of subframe classes indicate whether a respective subframe is potentially interfered by one or more neighbor base stations, and wherein said second subframe class assignment configuration is different from said first subframe class assignment configuration.

43. The base station of claim 42 wherein said first resource partition schedule is based on a first periodicity and said second resource partition schedule is based on a second periodicity different from said first periodicity.

44. The base station of claim 42 wherein at least one processor is further configured:
to broadcast schedules of said first and second resource partitions in a system information block (SIB) message.

45. The base station of claim 42 wherein said at least one processor is further configured:
to divide transmission frame structures, to which said first and second resource partitions are applicable, into three regions comprising:

a semi-persistent control region reserved at a first frequency edge and a second frequency edge of each of said transmission frame structures;

a data region having a second set of RBs reserved in a middle section of each of said transmission frame structures; and a dynamic control region having a third set of RBs reserved between said data region and said semi-persistent control region at each of said first frequency edge and said second frequency edge.

46. A user equipment (UE) configured for wireless communication, said UE comprising:
    at least one processor; and
    a memory coupled to said at least one processor,
    wherein said at least one processor is configured:
        to receive a control resource partition schedule from a serving cell;
        to receive a data resource partition schedule from said serving cell; and
        to transmit control signals according to said control resource partition schedule and transmit data signals according to said data resource partition schedule,
    wherein said control resource partition schedule uses a first subframe class assignment configuration specifying one of a plurality of subframe classes for each of a plurality of subframes of the control signals, and said data resource partition schedule uses a second subframe class assignment configuration specifying one of the plurality of subframe classes for each of a plurality of subframes of the data signals, wherein the plurality of subframe classes indicate whether a respective subframe is potentially interfered by one or more neighbor base stations, and wherein said second subframe class assignment configuration is different from said first subframe class assignment configuration.

47. The UE of claim 46 wherein said control resource partition schedule is based on a first periodicity and said data resource partition schedule is based on a second periodicity different from said first periodicity.

48. The UE of claim 46 wherein said control resource partition schedule and said data resource partition schedule are received in a same system information block (SIB) message.

49. The UE of claim 46 wherein transmission frame structures, to which said control resource partition schedule and said data resource partition schedule are applicable, are divided into three regions comprising:
    a semi-persistent control region having a first set of resource blocks (RBs) reserved on a beginning edge and ending edge of each of said transmission frame structures;
    a data region having a second set of RBs reserved in a middle section of each of said transmission frame structures; and
    a dynamic control region having a third set of RBs reserved between said data region and said semi-persistent control region at each of said beginning and said ending edges.

50. The UE of claim 49 wherein said control signals comprise one or more of: semi-persistent control signals and dynamic control signals.

51. The UE of claim 50
    wherein said at least one processor configured to transmit said control signals is configured:
        to transmit said semi-persistent control signals in said semi-persistent control region;
        to transmit said dynamic control signals, when present, in said dynamic control region; and
    wherein said at least one processor configured to transmit said data signals is configured:
        to transmit said data signals in said data region.

52. The method of claim 1, wherein the plurality of subframe classes comprise:
    a protected class related to subframes that are classified as prohibited class subframes at the one or more neighbor base stations and are free from interference from the one or more neighbor base stations;
    a prohibited class related to subframes that are classified as protected class subframes at one of the one or more neighbor base stations; and
    a common class related to subframes that are classified as common class subframes at the one or more neighbor base stations and are potentially used for data transmission by the one or more neighbor base stations.

* * * * *